(12) United States Patent
Lev et al.

(10) Patent No.: US 7,779,222 B1
(45) Date of Patent: Aug. 17, 2010

(54) DYNAMIC MEMORY WORK-STEALING

(75) Inventors: Yosef Lev, Cambridge, MA (US); Nir N. Shavit, Cambridge, MA (US)

(73) Assignee: Oracle America, Inc., Redwood City, CA (US)

(*) Notice: Subject to any disclaimer, the term of this patent is extended or adjusted under 35 U.S.C. 154(b) by 93 days.

(21) Appl. No.: 11/187,631

(22) Filed: Jul. 22, 2005

Related U.S. Application Data

(60) Provisional application No. 60/590,671, filed on Jul. 23, 2004.

(51) Int. Cl.
*G06F 12/00* (2006.01)
*G06F 13/00* (2006.01)
*G06F 13/28* (2006.01)
*G06F 9/46* (2006.01)

(52) U.S. Cl. .................. 711/170; 711/153; 718/100; 718/102; 718/104; 718/105

(58) Field of Classification Search .............. None
See application file for complete search history.

(56) References Cited

U.S. PATENT DOCUMENTS

| | | | | |
|---|---|---|---|---|
| 5,838,994 A | * | 11/1998 | Valizadeh | ............ 710/56 |
| 6,560,619 B1 | * | 5/2003 | Flood et al. | ............ 707/206 |
| 6,823,351 B1 | * | 11/2004 | Flood et al. | ............ 707/206 |
| 2001/0056420 A1 | * | 12/2001 | Steele et al. | ............ 707/8 |
| 2003/0005025 A1 | * | 1/2003 | Shavit et al. | ............ 709/102 |
| 2004/0015510 A1 | * | 1/2004 | Moir et al. | ............ 707/101 |
| 2004/0088702 A1 | * | 5/2004 | Garthwaite et al. | ......... 718/100 |

OTHER PUBLICATIONS

"The Performance of Work Stealing in Multiprogrammed Environments", Robert D. Blumofe and Dionisios Papadopoulos, Department of Computer Sciences, The university of Texas at Austin, May 28, 1998.*
"Thread Scheduling for Multiprogrammed Multiprocessors" Authors: Nimar S. Arora, Robert D. Blumofe, C. Greg Plaxton SPAA 98 Peurto Vallarta Mexico Copyright ACM 1998 0-89791-989-0/ 98/6 pp. 119-129.

* cited by examiner

*Primary Examiner*—Sheng-Jen Tsai
*Assistant Examiner*—Michael Alsip
(74) *Attorney, Agent, or Firm*—Osha • Liang LLP

(57) ABSTRACT

A dynamic memory work-stealing technique involves the implementation of a deque as a doubly-linked list of nodes. All, or almost all, of the nodes are memory structures that may be dynamically allocated and freed from a shared node pool accessible to a plurality of processes. When a process has exhausted its local memory resources, the process may "steal" memory resources from another process that has available memory resources.

22 Claims, 11 Drawing Sheets

US 7,779,222 B1

DYNAMIC MEMORY WORK-STEALING

CROSS-REFERENCE TO RELATED APPLICATIONS

This application claims benefit from U.S. Provisional Patent Application No. 60/590,671 filed Jul. 23, 2004.

BACKGROUND OF INVENTION

A modern computer system has at least a microprocessor and some form of memory. Generally, the processor processes retrieves data stored in the memory, processes/uses the retrieved data to obtain a result, and stores the result in the memory.

One type of computer system uses a single processor to perform the operations of the computer system. In such a single processor (or "uniprocessor") computer system, incoming memory requests to memory occur serially. However, as described below with reference to FIG. 1, in a computer system that uses multiple processors at least partly in order to increase data throughput, due to parallel processing (i.e., simultaneous processing by two or more processors), memory shared by multiple processors may receive multiple memory requests that overlap in both time and space.

FIG. 1 shows a typical multiprocessor system (100). In FIG. 1, multiple processors (102, 104) share a memory (106) formed of numerous individual memory locations. An important design consideration in shared memory multiprocessor systems involves balancing work loads among processors. When a particular processor finds that it lacks the resources to perform a particular thread of work, the processor may obtain necessary resources from a processor that has such resources available. Such a technique is known and referred to as a "work-stealing" technique.

In a typical work-stealing technique such as, for example, that described in "Thread Scheduling for Multiprogrammed Multiprocessors" by N. Arora et al., each process maintains its own pool of ready threads from which the process obtains work resources. If the pool of a particular process becomes empty (due to, for example, heavy work demand on the process), that process becomes a "thief" and steals a thread from the pool of a "victim" process chosen at random as discussed below with reference to FIG. 2.

As shown in FIG. 2, a pool of threads (200) for a process is maintained with a fixed-size double-ended memory queue (or deque (202)), which has a top (204) that indexes the top thread and a variable bottom (206) that indexes the deque location below the bottom thread. In general, the typical work-stealing technique involves a collection of deque data structures as shown in FIG. 2, where a local process performs pushes and pops on the "bottom" end of its deque and a thief process perform a pop on the "top" end of a victim process's deque. A pop operation is also referred to as a "removal-type operation."

Further, those skilled in the art will recognize that for n processes and a total allocated memory size m, each deque may have up to a memory size of m/n. Accordingly, designers often have to implement costly mechanisms to manage deque overflow.

To obtain work, i.e., to obtain a thread, a process pops a ready thread from the bottom of its deque and commences executing that thread. The process continues to execute that thread until the thread either blocks or terminates, at which point the process returns to its deque to obtain another ready thread. During the course of executing a thread, if a new thread is created or a blocked thread is unblocked, the process pushes that thread onto the bottom of its deque. Alternatively, the process may preempt the thread it was executing, push that thread onto the bottom of its queue, and commence executing the newly available ready thread. Those skilled in the art will recognize that as long as the deque of a process is non-empty, the process manipulates its deque in a last-in-first-out (LIFO) manner.

If a process finds that its deque is empty when the process attempts to obtain work by popping a thread off the bottom of its deque, the process becomes a thief. In this case, the thief process picks a victim at random and attempts to "steal" work, i.e., obtain a thread, by removing the thread at the top of the queue belonging to the victim process. If the deque of the victim process is empty, the thief process picks another victim process and tries to steal work again. The thief process repeatedly attempts to steal work until the thief process finds a victim process that has a deque that is non-empty, at which point, the thief process "reforms" (i.e., ceases to be a thief) and commences work on the stolen thread as discussed above. Those skilled in the art will recognize that because work-stealing takes place at the top of a victim process's deque, work-stealing operates in a first-in-first-out (FIFO) manner.

When a thief process and a victim process concurrently attempt to obtain the same thread from the victim process's deque, a synchronization operation must be invoked to ensure proper operation. This scenario is detected by examining the gap between the top and bottom indexes. If the indexes are "too close," a synchronization operation using known non-blocking primitives such as Compare&Swap or Load-Linked/Store-Conditional may be invoked.

Due to the fixed-size memory space dedicated to each process in a typical work-stealing technique, applications that use the work-stealing technique (e.g., garbage collection) implement specific blocking mechanisms to handle overflow situations. One approach used to lessen the frequency of overflow handling involves resetting top and bottom to point back to the beginning of the deque every time an empty deque condition is detected. However, although such a reset operation may lessen the amount of times overflow occurs, costly mechanisms to manage overflow are still needed for those times that overflow still occurs.

SUMMARY OF INVENTION

According to one aspect of one or more embodiments of the present invention, a computer system comprises: a plurality of integrated circuits capable of concurrently executing a first process and a second process; and memory having a deque local to the first process, where the computer system is configured to dynamically allocate memory to the deque when the deque needs additional memory for a first type of operation on one end of the deque, where the one end of the deque is only accessible by the first process, where a non-blocking operation on another end of the deque is invocable by the second process, and where, on the another end of the deque, only a removal-type operation is possible.

According to another aspect of one or more embodiments of the present invention, a method of performing computer system operations comprises: implementing in memory a first deque having a first node that holds values usable by a first process; invoking an operation to add a value to one end of the first deque, where the one end of the first deque is only accessible to the first process; if the first deque is full, dynamically allocating from memory a second node and linking the second node to the first node; and if a second deque implemented in memory for use by a second process is empty, invoking a non-blocking operation to obtain a value from another end of the first deque, where, on the another end of the first deque, only a removal-type operation is possible.

According to another aspect of one or more embodiments of the present invention, a computer system comprises: a deque associated with a first process in a shared memory multiprocessor system and implemented in memory as a doubly-linked list of nodes, the deque having a top pointer and a bottom pointer; and instructions stored in memory to: (i) in response to an operation invoked by the first process to add a value to one end of the deque, (a) store the value in a node pointed to by the bottom pointer, and (b) if the node pointed to by the bottom pointer is full, dynamically allocate and link an additional node to the list, where the one end of the deque is only accessible to the first process; and (ii) in response to a non-blocking operation invoked by a second process to remove a value from another end of the deque, if the deque is not empty, return to the second process a value of a node pointed to by the top pointer, where, on the another end of the deque, only a removal-type operation is possible.

According to another aspect of one or more embodiments of the present invention, a computer system comprises a plurality of integrated circuits, a memory accessible to the plurality of integrated circuits, and instructions in the memory to: implement in memory a first deque having a first node that holds values usable by a first process; invoke an operation to add a value to one end of the first deque, where the one end of the first deque is only accessible to the first process; if the first deque is full, dynamically allocate from memory a second node and link the second node to the first node; and if a second deque implemented in memory for use by a second process is empty, invoke a non-blocking operation to obtain a value from another end of the first deque, where, on the another end of the first deque, only a removal-type operation is possible.

Other aspects and advantages of the invention will be apparent from the following description and the appended claims.

DETAILED DESCRIPTION

Figure 3:
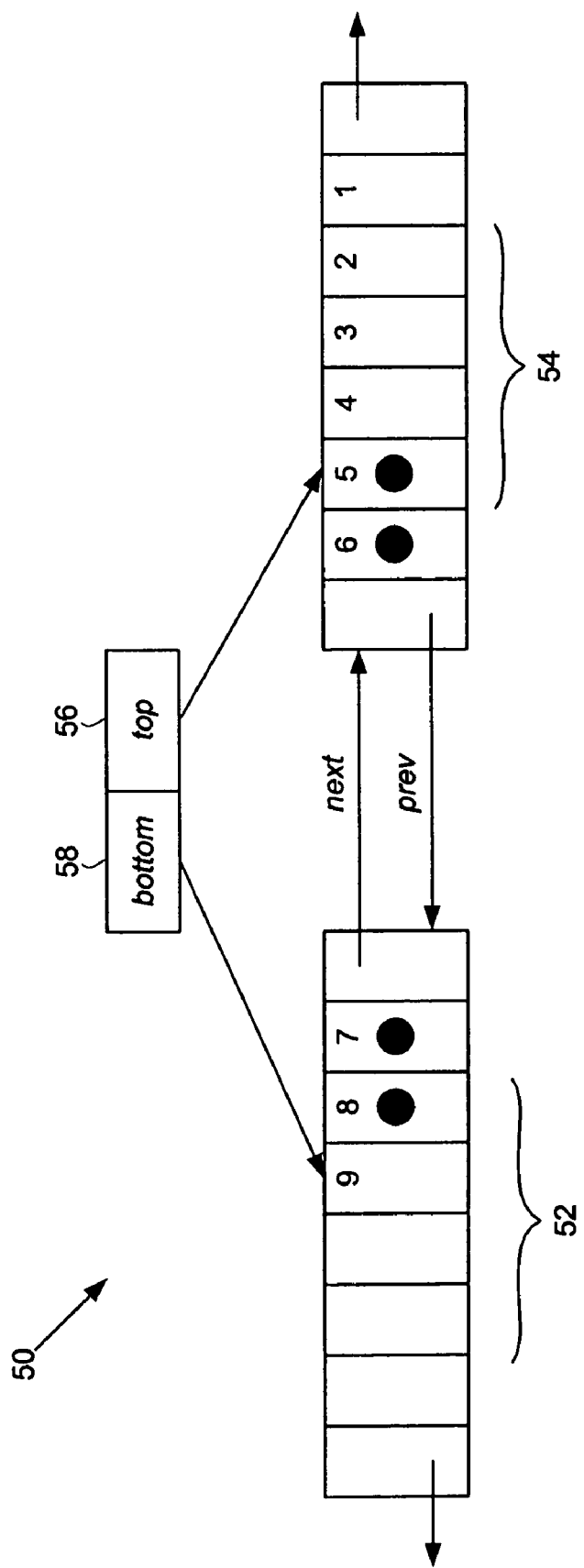
FIG. 3 shows an implementation of a deque in accordance with an embodiment of the present invention.

Embodiments of the present invention relate to a dynamic memory work-stealing technique. FIG. 3 shows an exemplary implementation of a deque (50) in accordance with an embodiment of the present invention. The deque (50) is implemented as a doubly-linked list of nodes (52, 54), almost all or each of which is an array that may be dynamically allocated and freed from a shared node pool (not shown). The individual node entries may be updated to contain or remove values that point to threads (not shown) usable to perform work. Further, the deque (50) has a variable top (56) that references the node entry having the pointer to the "top" thread (not shown) and a variable bottom (58) that references the node entry immediately below the node entry having the pointer to the "bottom" thread (not shown).

In one or more embodiments of the present invention, the shared node pool maintains a local node pool of g nodes for each process. When the nodes in a local node pool of a process are exhausted, a new group of g nodes may be allocated from the shared node pool (e.g., a last-in-first-out (LIFO) pool) using a synchronization operation. When a process frees a node, the node is returned to the process's local node pool, and if the size of the process's local node pool exceeds 2 g, g nodes may be returned to the shared node pool. Those skilled in the art will recognize that various other techniques may be used to implement the shared node pool.

Further, those skilled in the art will recognize that although the deque (50) shown in FIG. 3 has only two nodes (52, 54), a deque in accordance with embodiments of the present invention may have any number of dynamically allocated and non-dynamically allocated nodes.

For purposes of description, an operation to add a value at the bottom of a deque is referred to as a PushBottom operation, an operation to remove a value at the bottom of a deque is referred to as a PopBottom operation, and an operation to remove a value at the top of a deque is referred to as a PopTop operation. Those skilled in the art will note that a PushBottom operation and a PopBottom operation are performed locally by a process on its deque, whereas a PopTop operation is performed by a thief process on a victim process's deque.

Figure 4:
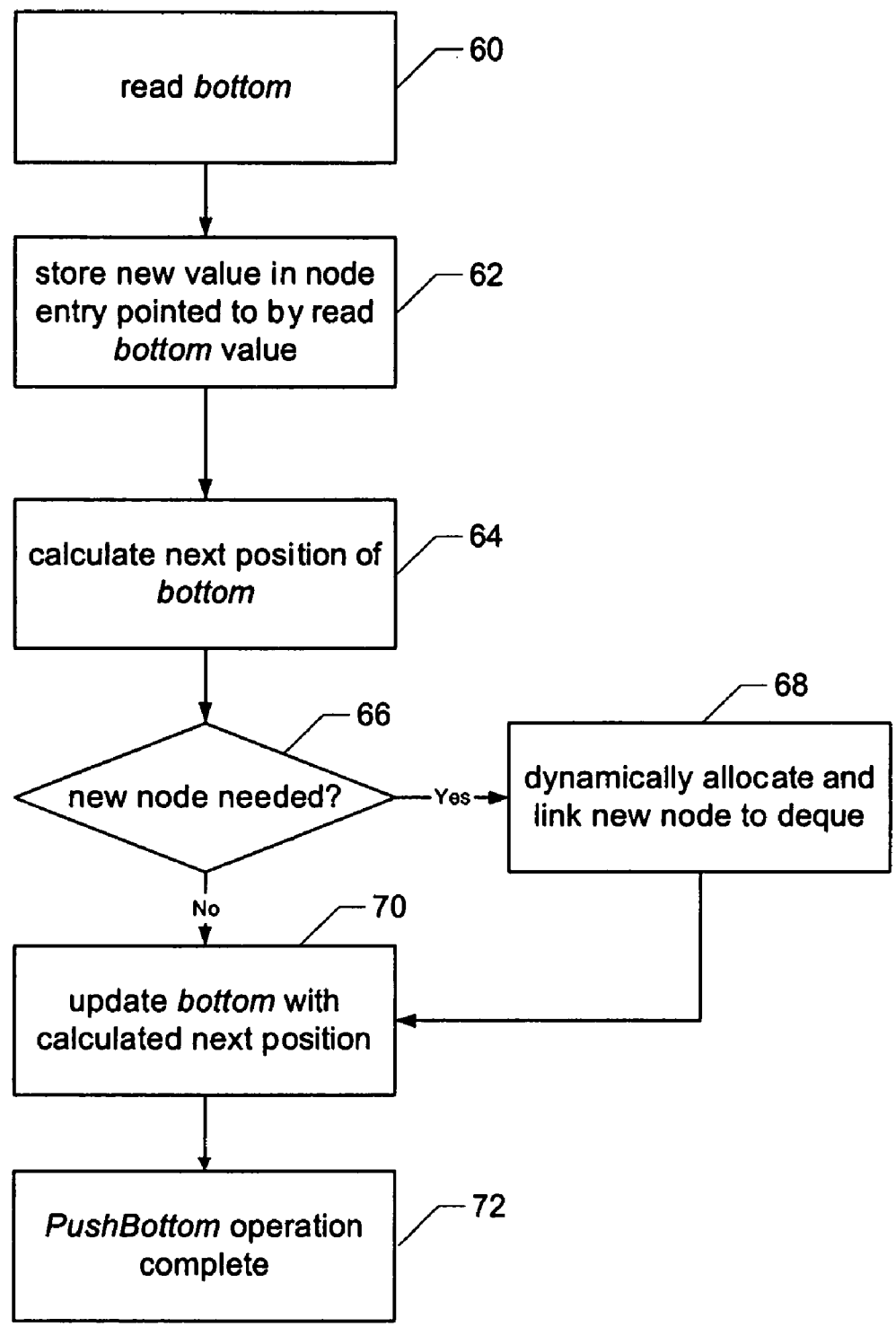
FIG. 4 shows a flow process of a PushBottom operation in accordance with an embodiment of the present invention.

FIG. 4 shows an exemplary flow process of a PushBottom operation in accordance with an embodiment of the present invention. When a PushBottom operation is invoked, the value of bottom is read (ST60), and the new value is stored in the node entry pointed to by the value of bottom (ST62). Then, the next position of bottom is calculated (ST64). If the calculated next position of bottom indicates that a new node is needed (ST66), then a new node is dynamically allocated and linked to the current doubly-linked list of nodes in the deque (ST68). Then, bottom is updated with the calculated next position (ST70), which then becomes the current position of bottom, thereby completing the PushBottom operation (ST72).

Those skilled in the art will recognize that non-synchronization operations (e.g., writes) are used to (i) store a new value in the node entry pointed to by the value of bottom in step 62 and (ii) update bottom in step 70.

Further, those skilled in the art will recognize that when it is determined that a new node is needed in step 66, the new node is dynamically allocated and linked prior to the update of bottom in step 70, thereby preserving the list structure for the nodes between top and bottom.

Figure 5A:
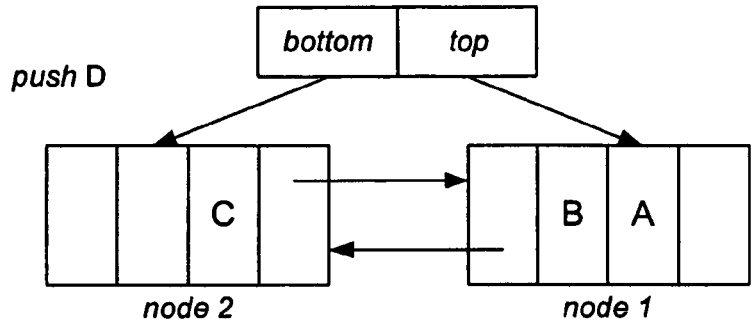
FIGS. 5A, 5B, and 5C show exemplary stages of a deque undergoing a PushBottom operation in accordance with an embodiment of the present invention.
Figure 5B:
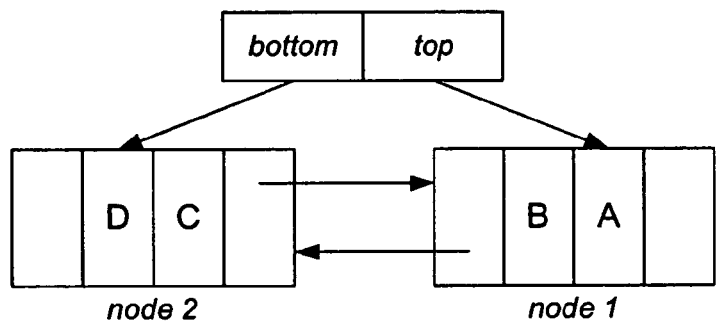
Figure 5C:
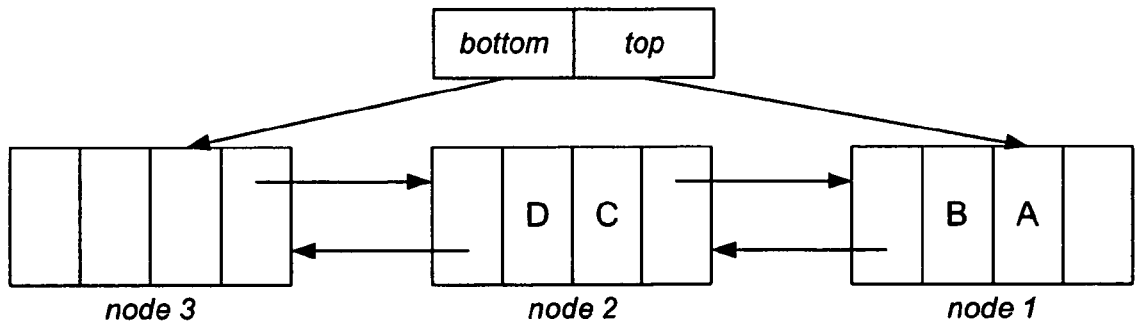

FIGS. 5A, 5B, and 5C show stages of an exemplary deque undergoing an exemplary PushBottom operation in accordance with an embodiment of the present invention. In FIG. 5A, top points to node entry A in node 1 and bottom points to the node entry immediately below node entry C in node 2. When a PushBottom operation is invoked to push D onto the bottom of the deque, D is written to the node entry pointed to by bottom as shown in FIG. 5B. Thereafter, bottom is updated to its next position, which, as shown in FIG. 5C, involves allocating node 3.

Figure 6:
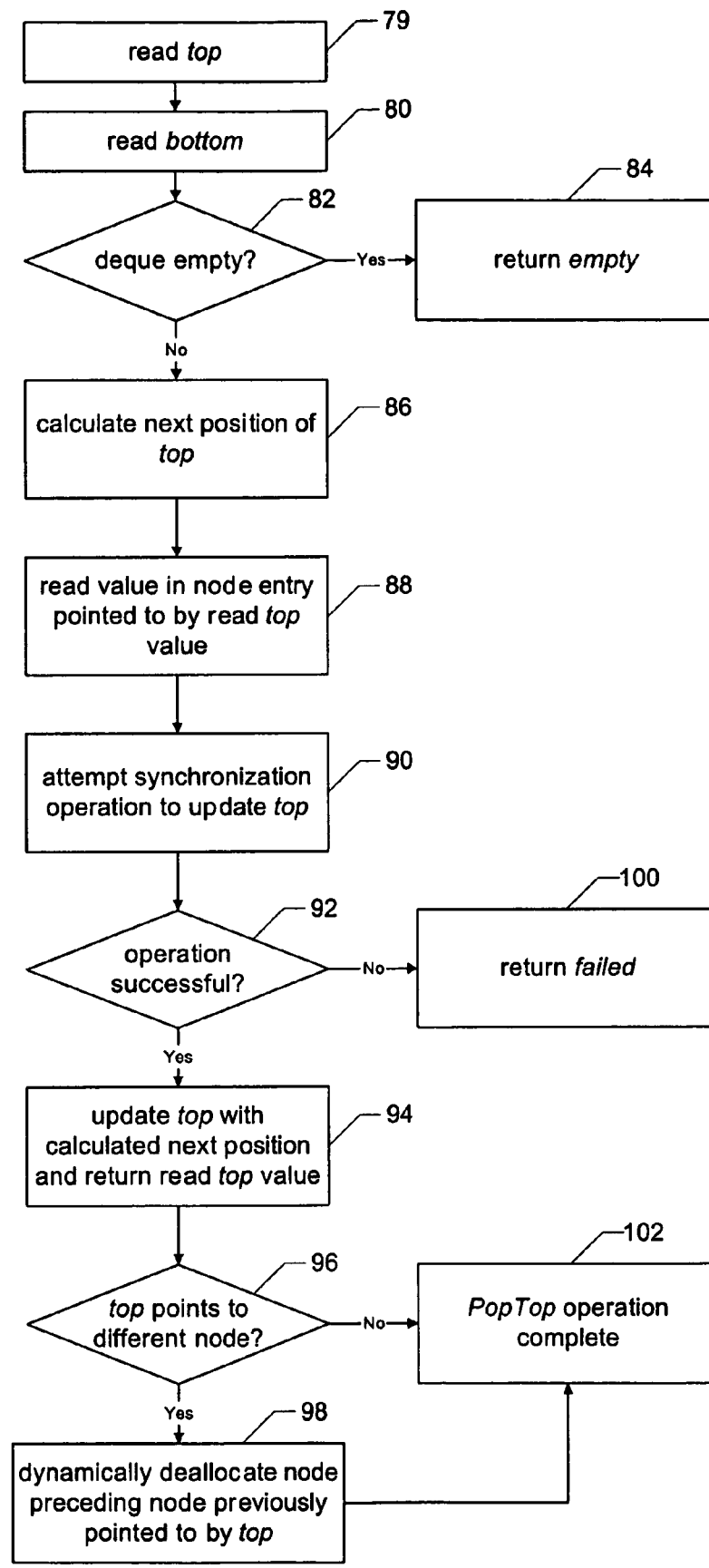
FIG. 6 shows a flow process of a PopTop operation in accordance with an embodiment of the present invention.

FIG. 6 shows an exemplary flow process of a PopTop operation in accordance with an embodiment of the present invention. When a PopTop operation is invoked, the value of top is first read (ST79), and then the value of bottom is read (ST80). Then, a determination is made as to whether the read values of top and bottom indicate that the deque is empty (ST82). If the deque is empty, the PopTop operation returns empty (ST84). Otherwise, if the deque is not empty, the next position of top is calculated (ST86). Then, the value in the node entry currently pointed to by top is read (ST88).

After the read in ST88, a synchronization operation (e.g., a Compare&Swap operation) is attempted to update top with the calculated next position of top (ST90). The synchronization operation is performed to ensure that other PopTop and/or PopBottom operations are not concurrently attempting to pop the same entry as the current PopTop operation.

If the synchronization operation is successful (ST92), then (i) top is updated and the value of the node entry read in step 88 is returned (to the thief process) (ST94), and (ii) a determination is made as to whether the update of top causes top to point to a node different than that pointed to by top prior to the update of top (ST96). If top does point to a different node, then the node preceding the node previously pointed to by top is dynamically deallocated (i.e., "freed") (ST98), thereby completing the PopTop operation (ST102). Otherwise, if the synchronization operation is unsuccessful (ST92), the PopTop operation returns failed (ST100).

Those skilled in the art will recognize that in one or more embodiments of the present invention, the read in step 88 occurs prior to the update of top in step 94 in view of the possibility that the node entry previously pointed to by top may have already been freed by some other concurrent PopTop operation.

Figure 7A:
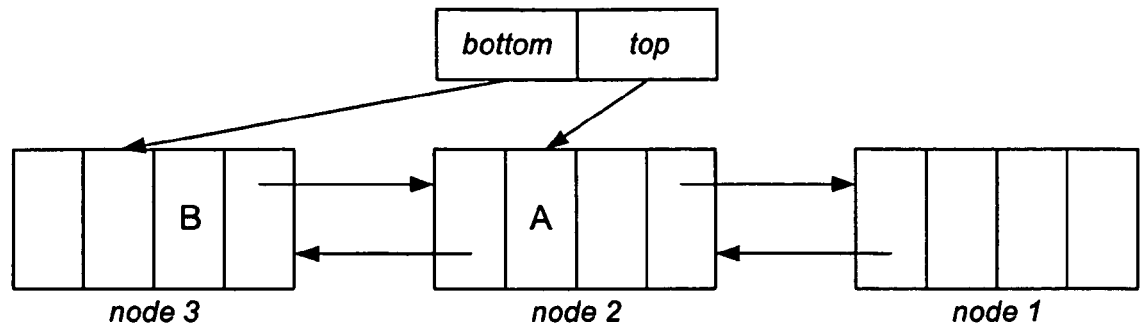
FIGS. 7A, 7B, and 7C show exemplary stages of a deque undergoing a PopTop operation in accordance with an embodiment of the present invention.
Figure 7B:
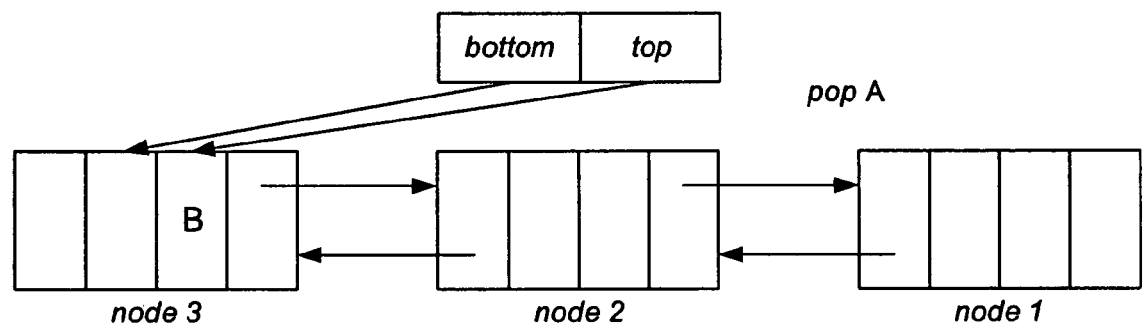
Figure 7C:
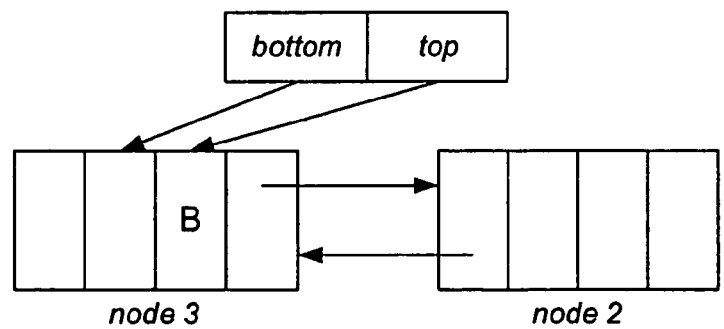

FIGS. 7A, 7B, and 7C show stages of an exemplary deque undergoing an exemplary PopTop operation in accordance with an embodiment of the present invention. In FIG. 7A, top points to node entry A in node 2 and bottom points to the node entry immediately below node entry B in node 3. When a PopTop operation is invoked to pop a value from the top of the deque, node entry A is returned and top is updated to its next position as shown in FIG. 7B. Further, because the update of top results in top pointing to a node different than that pointed to by top prior to the update of top, node 1, which preceded node 2 (i.e., the node previously pointed to by top), is removed from the deque as shown in FIG. 7C.

Figure 8:
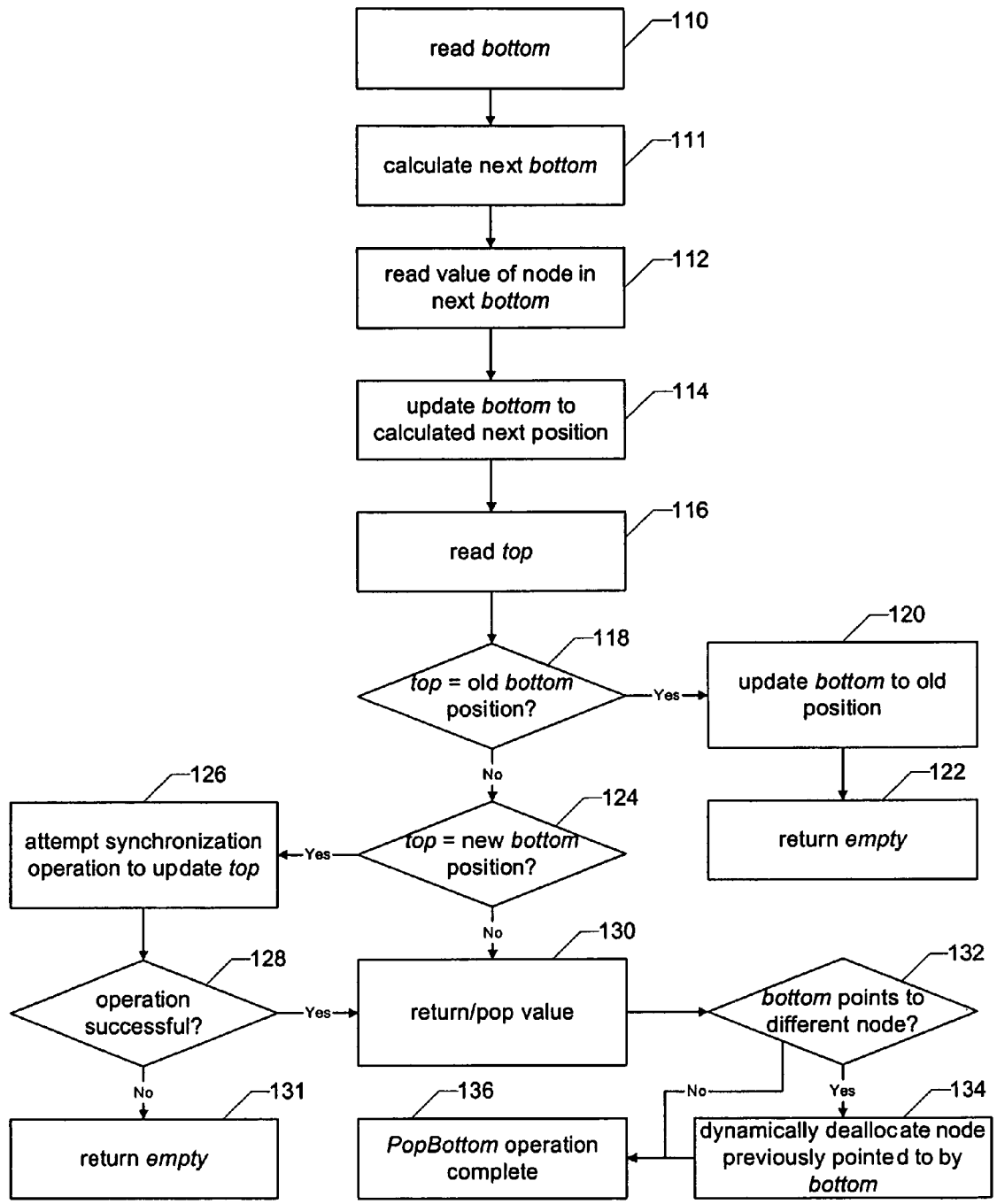
FIG. 8 shows a flow process of a PopBottom operation in accordance with an embodiment of the present invention.

FIG. 8 shows an exemplary flow process of a PopBottom operation in accordance with an embodiment of the present invention. When a PopBottom operation is invoked, (i) the value of bottom is read (ST110), (ii) the next position of bottom is calculated (ST111), (iii) the value stored in the node in the calculated next position of bottom is read (i.e., the value to be popped is read) (ST112), and (iv) bottom is updated to its next position (ST114). Then, the value of top is read (ST116). If the read value of top points to the old position of bottom (i.e., the position of bottom prior to being updated in step 114) (ST118), this indicates that the deque is empty. In this case, (i) bottom is re-updated with its old position (ST120), and (ii) the PopBottom operation returns empty to indicate that the deque is empty (ST122).

Else, if the read value of top points to the new position of bottom (i.e., the position of bottom after being updated in step 114) (ST124), this indicates that the value to be popped is the last entry in the deque. In this case, a synchronization operation (e.g., a Compare&Swap operation) attempts to update top's tag value to ensure that a concurrent PopTop operation attempting to pop the same entry as the current PopBottom operation (ST126) will not succeed in doing so. If the synchronization operation fails (ST128), this indicates that a concurrent PopTop operation already returned (i.e., popped) the last entry in the deque, and therefore, the PopBottom operation returns empty (ST131).

On the other hand, if the synchronization operation is successful (ST128) or was not invoked to begin with due to the value of top not pointing to the new (or updated) position of bottom (ST124), (i) the value of the entry to be popped (i.e., the entry pointed to by the updated bottom) is returned (ST130) and (ii) a determination is made as to whether the updated bottom points to a node different than that pointed to by bottom prior to the update of bottom in ST114 (ST132). If bottom does point to a different node, then the node previously pointed to by bottom is dynamically deallocated (i.e., "freed") (ST134), thereby completing the PopBottom operation (ST136).

Figure 9A:
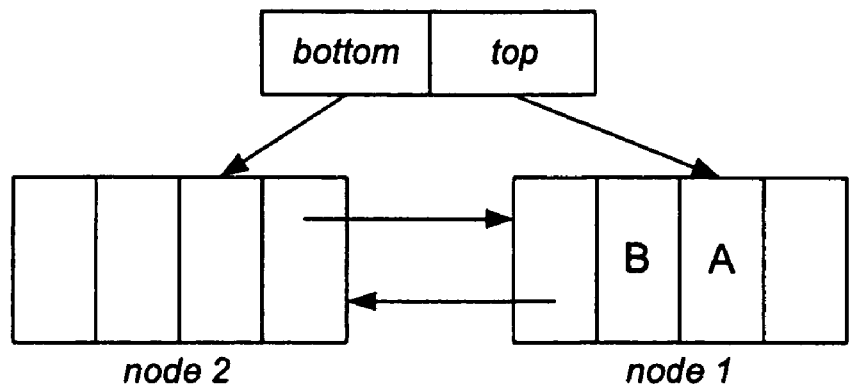
FIGS. 9A, 9B, and 9C show exemplary stages of a deque undergoing a PopBottom operation in accordance with an embodiment of the present invention.
Figure 9B:
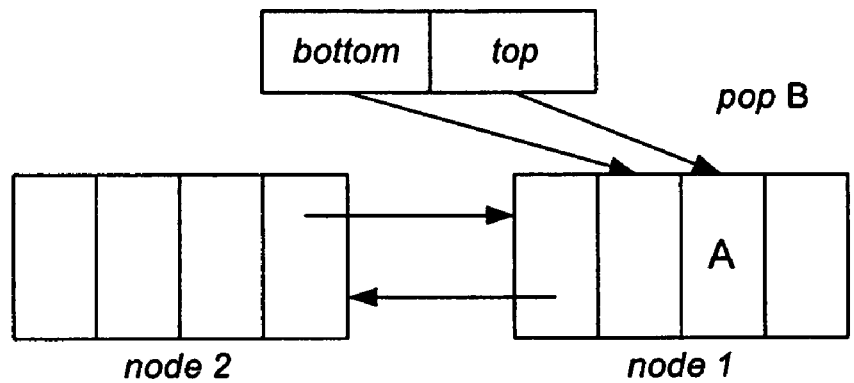
Figure 9C:
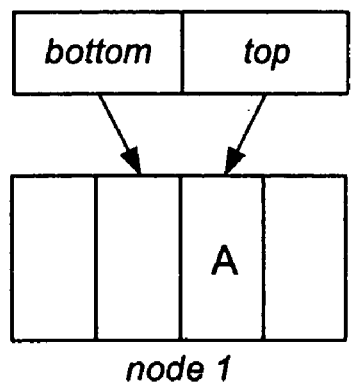

FIGS. 9A, 9B, and 9C show stages of an exemplary deque undergoing an exemplary PopBottom operation in accordance with an embodiment of the present invention. In FIG. 9A, top points to node entry A in node 1 and bottom points to the first node entry in node 2 due to there being no available node entry below node entry B in node 1. When a PopBottom is invoked to pop a value from the bottom of the deque, node entry B is returned and bottom is updated to its next position as shown in FIG. 9B. Further, because the updated bottom points to a node different than that pointed to by bottom prior to the update of bottom, node 2 (i.e., the node previously pointed to by bottom), is removed from the deque as shown in FIG. 9C.

Figure 10A:
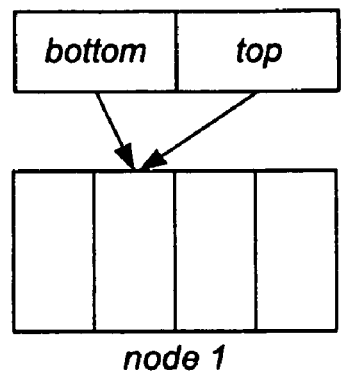
FIGS. 10A, 10B, and 10C show exemplary stages of a deque undergoing a PopBottom operation in accordance with an embodiment of the present invention.
Figure 10B:
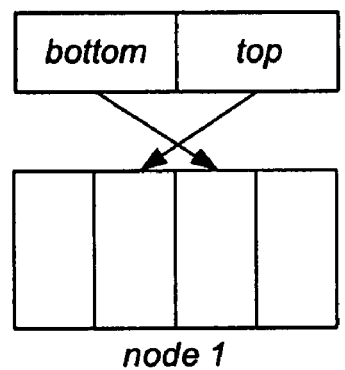
Figure 10C:
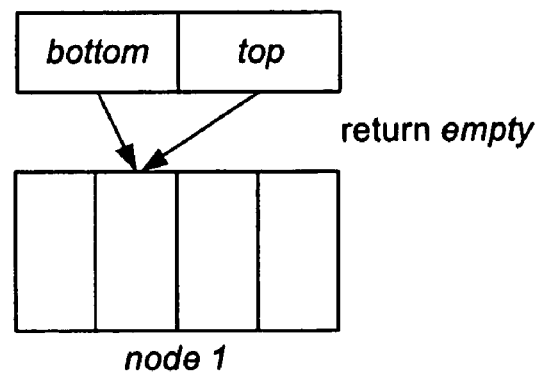

FIGS. 10A, 10B, and 10C show stages of an exemplary deque undergoing an exemplary PopBottom operation in accordance with an embodiment of the present invention. As shown in FIG. 10A, the deque is empty as indicated by top and bottom pointing to the same position. When a PopBottom operation is invoked to pop a value from the bottom of the deque, bottom is updated to its next position as shown in FIG. 10B. However, because top points to the same position as bottom prior to bottom being updated, bottom is re-updated to its old position as and the PopBottom operation returns empty as shown in FIG. 10C.

Figure 11A:
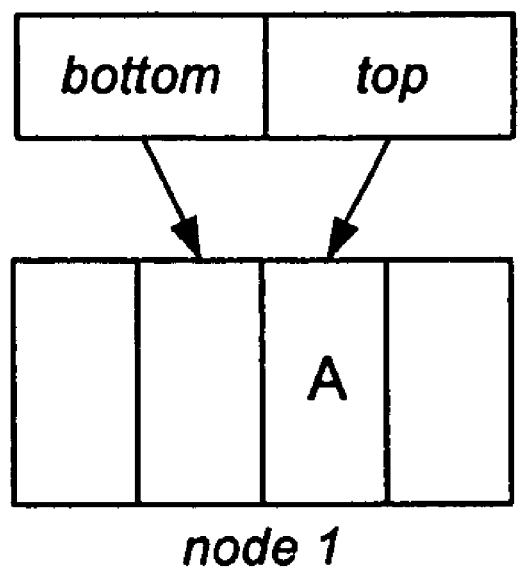
FIGS. 11A and 11B show exemplary stages of a deque undergoing a PopBottom operation in accordance with an embodiment of the present invention.
Figure 11B:
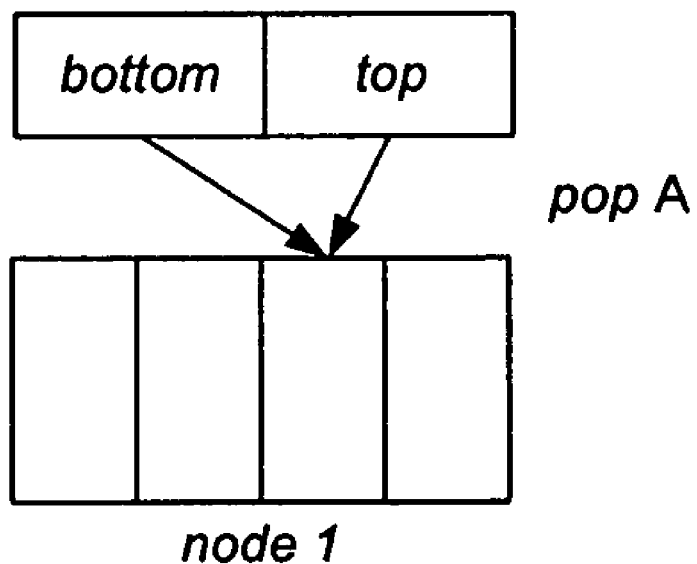

FIGS. 11A and 11B show stages of an exemplary deque undergoing an exemplary PopBottom operation in accordance with an embodiment of the present invention. In FIG. 11A, top points to node entry A in node 1 and bottom points to the node entry immediately below node entry A in node 1. When a PopBottom is invoked to pop a value from the bottom of the deque, node entry A is returned and bottom is updated to its next position as shown in FIG. 11B. Thus, at this point, top and bottom point to the same node entry indicating that the deque is now empty.

Further, in one or more embodiments of the present invention, a dynamic memory work-stealing technique may support a reset operation. The reset operation may be invoked when an empty deque condition is detected by a PopBottom operation. In the case that top and bottom pointed to the same node prior to the invocation of the reset operation, top and bottom may be reset to point to the beginning of that node. In the case that top and bottom pointed to different nodes prior to the invocation of the reset operation, top and bottom may be reset to point to the node pointed to by top. Further, in one or more embodiments of the present invention, if a node operation (e.g., a PopTop operation) occurs concurrently with a reset operation, the reset operation may reset top and/or bottom dependent on the result of the node operation.

Further, in one or more embodiments of the present invention, a deque may be implemented with a base node that is larger than the size of the nodes in the shared node pool. Such a base node is originally allocated to the process and is never freed to the shared node pool. Whenever a PopBottom or PopTop operation causes the base node to be freed, a local boolean flag may raised to indicate that the base node is free. When a PushBottom operation needs to allocate and link a new node, it first checks the local boolean flag, and if the boolean flag indicates that the base node is free, the base node is linked to the deque (instead of a node allocated from the shared node pool).

Figure 1:
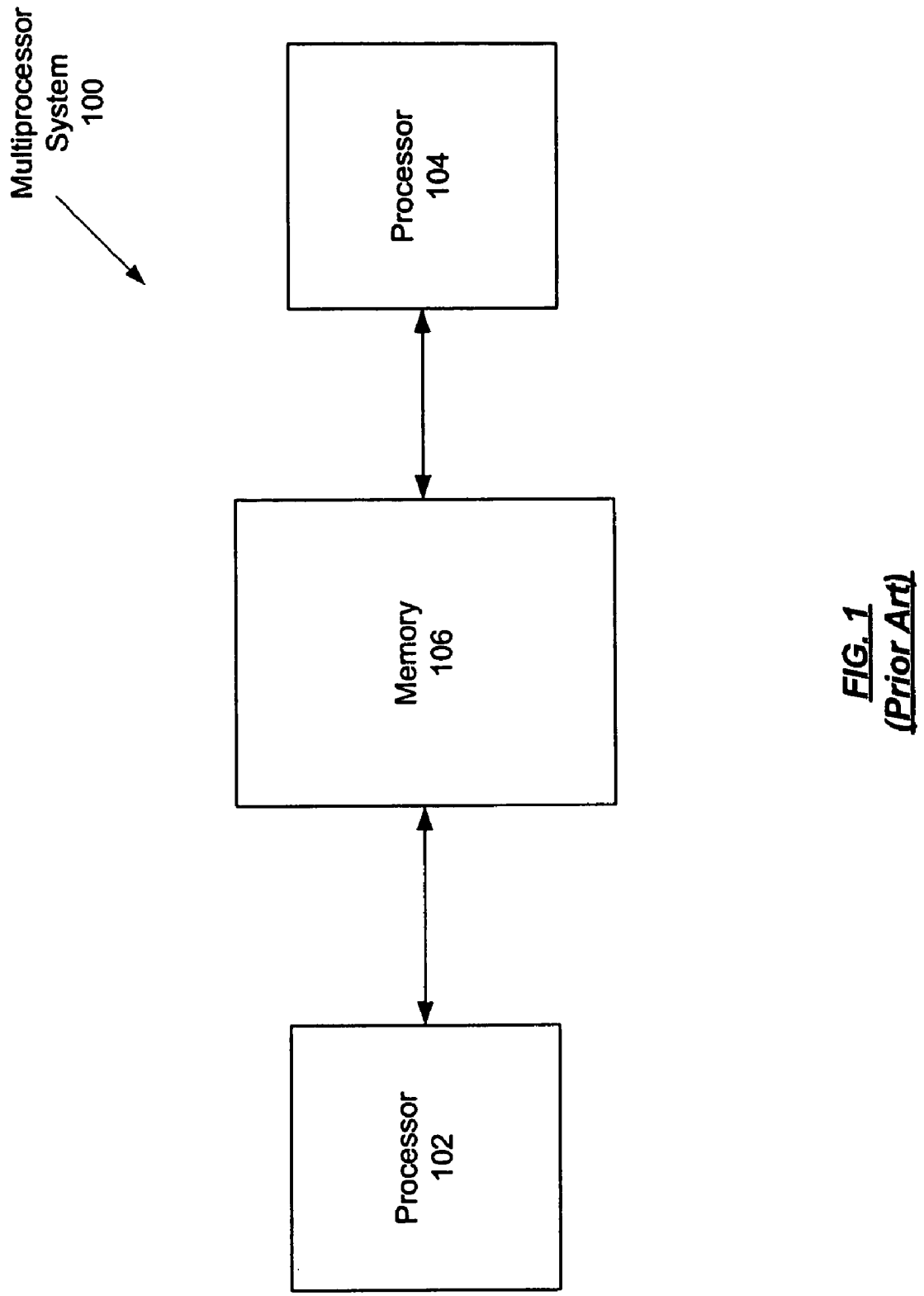
FIG. 1 shows a portion of a typical shared memory multiprocessor system.
Figure 2:
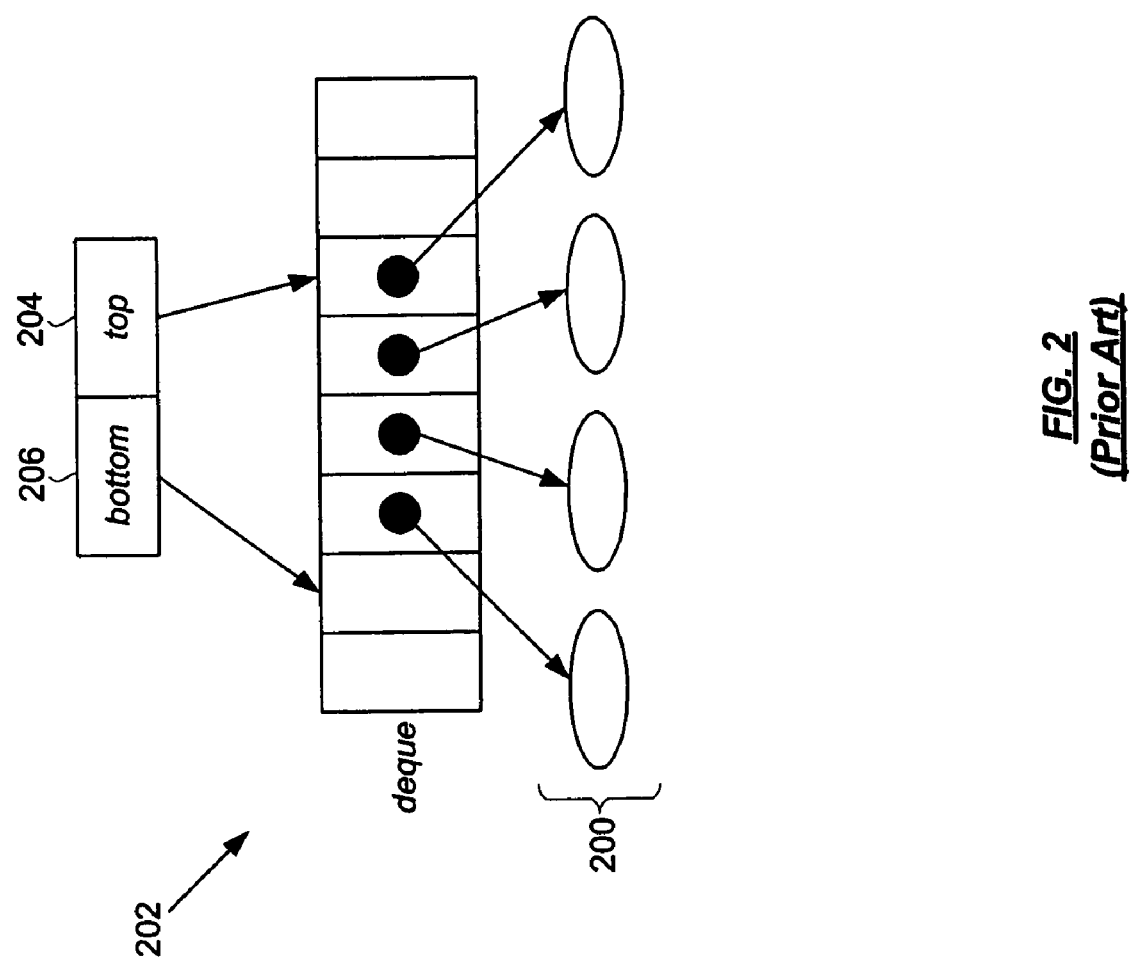
FIG. 2 shows a typical implementation of a deque.

Further, in one or more embodiments of the present invention, aspects of any of the deque implementations described above with reference to FIGS. 2-11B may be used in one or more various combinations. For example, in one embodiment of the present invention, when an overflow condition is predicted or detected when using an implementation of a deque as described above with reference to FIG. 2, the local process, as needed, may switch to using a deque implementation as described above with reference to FIG. 3 (dependent on, for example, a "flag" value used to indicate when a switch should take place). Further, in one or more embodiments of the present invention, a local process may also, as needed, switch from using a deque implementation as described above with reference to FIG. 3 to using a deque implementation as described above with reference to FIG. 2.

Advantages of the present invention may include one or more of the following. In one or more embodiments of the present invention, because a dynamic memory work-stealing technique allows for the dynamic allocation and deallocation of memory as needed, costly, specific overflow mechanisms otherwise needed to handle overflow conditions on fixed-size memory structures may be eliminated.

In one or more embodiments of the present invention, a dynamic memory work-stealing technique may provide efficient memory usage and/or improved robustness with respect to typical work-stealing techniques.

In one or more embodiments of the present invention, in a dynamic memory work-stealing technique, dynamic insertion and deletion of nodes in a deque may be performed using only loads and/or store operations as opposed to using synchronization operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
   a plurality of integrated circuits capable of concurrently executing a first process and a second process; and
   memory storing a deque comprising a doubly-linked list of nodes,
   wherein each node of the doubly-linked list of nodes comprises an array storing a plurality of references to threads usable by the first process, wherein the array exists before the deque is full,
   wherein the deque is local to the first process,
   wherein a bottom variable references a first end of the deque and a top variable references a second end of the deque, and
   wherein the computer system is configured to:
      calculate the bottom variable during an operation to add a first entry to the first end of the deque,
      add a first node to the first end of the deque based on the bottom variable, wherein the first node is allocated from a pool of nodes shared by the first process and the second process,
      recalculate the bottom variable during an operation to remove the first entry from the first end of the deque, and
      return the first node to the pool of nodes from the deque based on the recalculated bottom variable,
   wherein the first end of the deque is only accessible by the first process,
   wherein a non-blocking operation on a second end of the deque is invocable by the second process, and
   wherein, on the second end of the deque, only a removal-type operation is possible.

2. The computer system of claim 1, wherein operations on the first end of the deque occur in a LIFO manner, and wherein operations on the second end of the deque occur in a FIFO manner.

3. The computer system of claim 1, wherein the non-blocking operation on the second end of the deque is only invocable by the second process.

4. The computer system of claim 1, wherein the pool of nodes comprises a first local node pool for the first process and a second local node pool for the second process, wherein the computer system is configured to allocate the first node from the first local node pool, and wherein the computer system is configured to return the first node to the first local node pool.

5. The computer system of claim 4, wherein the computer system is further configured to:
   when the first local node pool is empty, allocate nodes from the pool of nodes to the first local node pool, and
   when a number of nodes in the first local node pool exceeds a predetermined number of nodes, return nodes in the first local node pool to the pool of nodes.

6. The computer system of claim 5, wherein the predetermined number of nodes is exactly twice a number of nodes returned from the first local node pool to the pool of nodes.

7. The computer system of claim 1, wherein the computer system is further configured to:
   calculate the top variable during an operation to remove a second entry from the second end of the deque, and
   return a second node from the second end of the deque to the pool of nodes based on the top variable.

8. The computer system of claim 7, wherein the computer system is further configured to:
   perform a synchronization operation prior to removing the second entry from the second end of the deque, wherein the synchronization operation ensures that another operation is not already attempting to remove the second entry.

9. The computer system of claim 1, wherein a first base node is associated with the first process and a second base node is associated with the second process, and wherein the first base node and the second base node are never returned to the pool of nodes.

10. The computer system of claim 9, wherein the first base node is larger than each node of the pool of nodes.

11. The computer system of claim 9, wherein the computer system is further configured to:
   free the first base node;

raise a Boolean flag indicating that the first base node is free, wherein the Boolean flag is local to the first process; and allocate the first base node instead of a shared node to the first process based on the Boolean flag.

12. The computer system of claim 1, wherein the computer system is further configured to:

switch the deque from fixed-sized to dynamically-sized when a memory overflow condition is detected.

13. A method of performing computer system operations, comprising:

implementing in memory a deque comprising a doubly-linked list of nodes, wherein each node of the doubly-linked list of nodes comprises an array storing a plurality of references to threads values usable by a first process, wherein the array exists before the deque is full, wherein a bottom variable references a first end of the deque and a top variable references a second end of the deque;

calculating the bottom variable during an operation to add a first entry to the first end of the deque;

adding a first node to a first end of the deque based on the bottom variable, wherein the first node is allocated from a pool of nodes shared by the first process and a second process;

recalculating the bottom variable during an operation to remove the first entry from the first end of the deque; and returning the first node to the pool of nodes from the deque based on the recalculated bottom variable, wherein the first end of the deque is only accessible by the first process, wherein a non-blocking operation on the second end of the deque is invocable by the second process, and wherein, on the second end of the deque, only a removal-type operation is possible.

14. The method of claim 13, wherein operations on the first end of the deque occur in a LIFO manner, and wherein operations on the second end of the deque occur in a FIFO manner.

15. The method of claim 13, wherein the pool of nodes comprises a first local node pool for the first process and a second local node pool for the second process, wherein the first node is allocated from the first local node pool, and wherein the first node is returned to the first local node pool.

16. The method of claim 15, wherein when the first local node pool is empty, nodes from the pool of nodes are allocated to the first local node pool, and when a number of nodes in the first local node pool exceeds a predetermined number of nodes, nodes in the first local node pool are returned to the pool of nodes.

17. The method of claim 13, further comprising:

calculating the top variable during an operation to remove a second entry from the second end of the deque, and returning a second node from the second end of the deque to the pool of nodes based on the top variable.

18. The method of claim 17, further comprising:

performing a synchronization operation prior to removing the second entry from the second end of the deque, wherein the synchronization operation ensures that another operation is not already attempting to remove the second entry.

19. The method of claim 13, wherein a first base node is associated with the first process and a second base node is associated with the second process, and wherein the first base node and the second base node are never returned to the pool of nodes.

20. The method of claim 19, wherein the first base node is larger than each node of the pool of nodes.

21. The method of claim 19, further comprising:

freeing the first base node;

raising a Boolean flag indicating that the first base node is free, wherein the Boolean flag is local to the first process; and allocating the first base node instead of a shared node to the first process based on the Boolean flag.

22. The method of claim 13, further comprising:

switching the deque from fixed-sized to dynamically-sized when a memory overflow condition is detected.

* * * * *

UNITED STATES PATENT AND TRADEMARK OFFICE
CERTIFICATE OF CORRECTION

PATENT NO. : 7,779,222 B1  Page 1 of 1
APPLICATION NO. : 11/187631
DATED : August 17, 2010
INVENTOR(S) : Yosef Lev It is certified that error appears in the above-identified patent and that said Letters Patent is hereby corrected as shown below:

In Claim 13, Column 9 (line 17), "values" should be deleted.

Signed and Sealed this

Nineteenth Day of October, 2010

David J. Kappos
*Director of the United States Patent and Trademark Office*